United States Patent [19]
Kimura et al.

[11] Patent Number: 6,053,081
[45] Date of Patent: Apr. 25, 2000

[54] METHOD FOR MACHINING SPHERICAL RECESS IN COMPRESSER PISTON

[75] Inventors: Kazuya Kimura; Hiroaki Kayukawa; Masaki Ota, all of Kariya, Japan

[73] Assignee: Kabushiki Kaisha Toyoda Jidoshokki Seisakusho, Aichi-Ken, Japan

[21] Appl. No.: 09/020,391

[22] Filed: Feb. 9, 1998

[30] Foreign Application Priority Data

Feb. 10, 1997 [JP] Japan .................................. 9-026566

[51] Int. Cl.⁷ ...................................................... B23B 3/00
[52] U.S. Cl. ...................... 82/1.11; 29/888.04; 409/132; 409/143
[58] Field of Search ................................. 409/132, 143, 409/165; 82/1.11; 29/888.04, 898.048; 451/50

[56] References Cited

U.S. PATENT DOCUMENTS

| | | | |
|---|---|---|---|
| 3,212,405 | 10/1965 | Smith | 409/132 |
| 3,608,407 | 9/1971 | Hitzemann | 82/1.11 |
| 4,116,110 | 9/1978 | Dines | 409/143 |
| 4,625,377 | 12/1986 | Kavthekar | 29/149.5 |
| 5,630,353 | 5/1997 | Mittlefehldt et al. | 92/71 |
| 5,823,721 | 10/1998 | Wagenseil | 409/132 |

FOREIGN PATENT DOCUMENTS

| | | | |
|---|---|---|---|
| 0223152 | 5/1987 | European Pat. Off. . | |
| 59-166407 | 9/1984 | Japan | 409/143 |
| 1-127201 | 5/1989 | Japan | 82/1.11 |
| 0624914 | 9/1994 | Japan . | |
| 6-249140 | 9/1994 | Japan . | |
| 927480 | 5/1982 | U.S.S.R. | 82/1.11 |
| 132254 | 7/1987 | U.S.S.R. | 409/143 |
| 1740135 | 6/1992 | U.S.S.R. | 82/1.11 |

*Primary Examiner*—Daniel W. Howell
*Assistant Examiner*—Christopher Kirkman
*Attorney, Agent, or Firm*—Morgan & Finnegan, L.L.P.

[57] ABSTRACT

A method for machining a variable displacement compressor piston. The piston is connected to a swash plate by a pair of semi-spherical shoes. One end of the piston has a slot for receiving the swash plate. The slot includes a pair of opposed walls. Each wall has a concave spherical recess for supporting one of the shoes. When forming the recesses, a tool having an asymmetrical spherical cutter is placed between the slot walls in the piston. Then, the piston is rotated about a machining axis that is perpendicular to the axis of the piston and intersects the midpoint between the walls. Then, the tool is moved such that the center of the cutter is located on the rotation axis of the piston. This forms the recesses on the walls such that the recesses conform to a single sphere, the center of which is located on the axis of the piston.

12 Claims, 3 Drawing Sheets

6,053,081

METHOD FOR MACHINING SPHERICAL RECESS IN COMPRESSER PISTON

BACKGROUND OF THE INVENTION

The present invention relates to a method for machining pistons incorporated in variable displacement compressors that are used in vehicle air conditioners. More particularly, the present invention relates to a method for forming shoe receiving recesses in pistons.

A typical compressor includes a crank chamber defined in a housing. A drive shaft is rotatably supported in the housing. Part of the housing is constituted by a cylinder block. The cylinder block includes cylinder bores, each of which accommodates a piston. A swash plate is fitted to the drive shaft in the crank chamber and supported to rotate integrally with the drive shaft. Each piston is coupled with the peripheral portion of the swash plate by shoes. The swash plate converts the rotation of the drive shaft to linear reciprocation of the pistons. The reciprocation of the pistons compresses refrigerant gas.

Each piston has a pair of concave recesses facing each other for slidably receiving a pair of shoes. Japanese Unexamined Patent Publication No. 6-249140 describes a method for forming such recesses in pistons. The method will be described with reference to FIG. 6.

As shown in FIG. 6, a slot is formed in a skirt 41a of a piston 41. The slot includes walls 42A and 42B, which face each other. A ball end mill 43 is placed between the walls 42A and 42B such that the axis L2 of the end mill 43 is perpendicular to the axis L1 of the piston 41. The ball end mill 43 includes a shank 43a and a spherical cutter 43b fixed to the distal end of the shank 43a. The center C2 of the cutter 43b is located at a midpoint (an initial position P1) between the walls 42A and 43B and on the axis L1 of the piston 41.

The ball end mill 43 is rotated about its axis L2. The piston 41 is then moved along its axis L1 in one direction by such an amount that the center C2 of the cutter 43b is moved with respect to the piston 41 from the initial position P1 to a first machining position P2. This causes the cutter 43b to form a concave recess 44A in the wall 42A. Subsequently, the piston 41 is moved along its axis L1 in the other direction by such an amount that the center C2 of the cutter 43b is moved from the first machining position P2 to a second machining position P3. This causes the cutter to form another concave recess 44B in the wall 42B.

In the method of FIG. 6, the recess 44A defines part of a first sphere, the center of which is a first machining position P2, and the recess 44B defines part of a second sphere, the center of which is the second machining position P3. As shown in FIG. 6, the center P2 is displaced from the center P3 by a distance S4.

However, ideally, the centers of the spheres should coincide to smoothly convert rotation of the drive shaft into linear reciprocation of the pistons via the swash plate. In other words, the recesses 44A and 44B should preferably conform to a single sphere. A variable displacement compressor includes a swash plate that is tiltably supported on a drive shaft. The inclination of the swash plate is changed for varying the displacement of the compressor. In such a compressor, the swash plate must be smoothly tilted. For optimally smooth tilting of the swash plate, it is important to accurately machine the recesses 44A, 44B so that the recesses 44A, 44B define a single sphere.

However, the method of FIG. 6 forms the recesses 44A and 44B so that they conform to different spheres, which hinders the performance of the resulting compressor.

SUMMARY OF THE INVENTION

Accordingly, it is an objective of the present invention to provide a piston machining method that forms a pair of shoe receiving recesses that conform to a common sphere.

To achieve the foregoing and other objectives and in accordance with the purpose of the present invention, a method for machining a pair of opposed spherical recesses, which conform to a single imaginary sphere, in opposite surfaces of a slot of a compressor piston is provided. The slot is more narrow than the diameter of the imaginary sphere. The method includes: providing an asymmetrical cutter that is, at its widest point, narrower than the slot as measured in the direction of the longitudinal axis of the piston, wherein the cutter generates a sphere if rotated about a tool axis; moving one of the cutter and the piston with respect to the other such that the cutter enters the slot without contacting either of the opposite surfaces, wherein the cutter has a center point that coincides with the center of the generated sphere, and wherein the generated sphere is the same size as the imaginary sphere; rotating the piston about a machining axis to simultaneously machine the recesses, wherein the machining axis intersects the center point of the cutter; and moving one of the cutter and the piston with respect to the other to remove the cutter from the slot without contacting either of the opposite surfaces.

The above machining method may be used for machining pistons in a variable displacement compressor.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Figure 3:
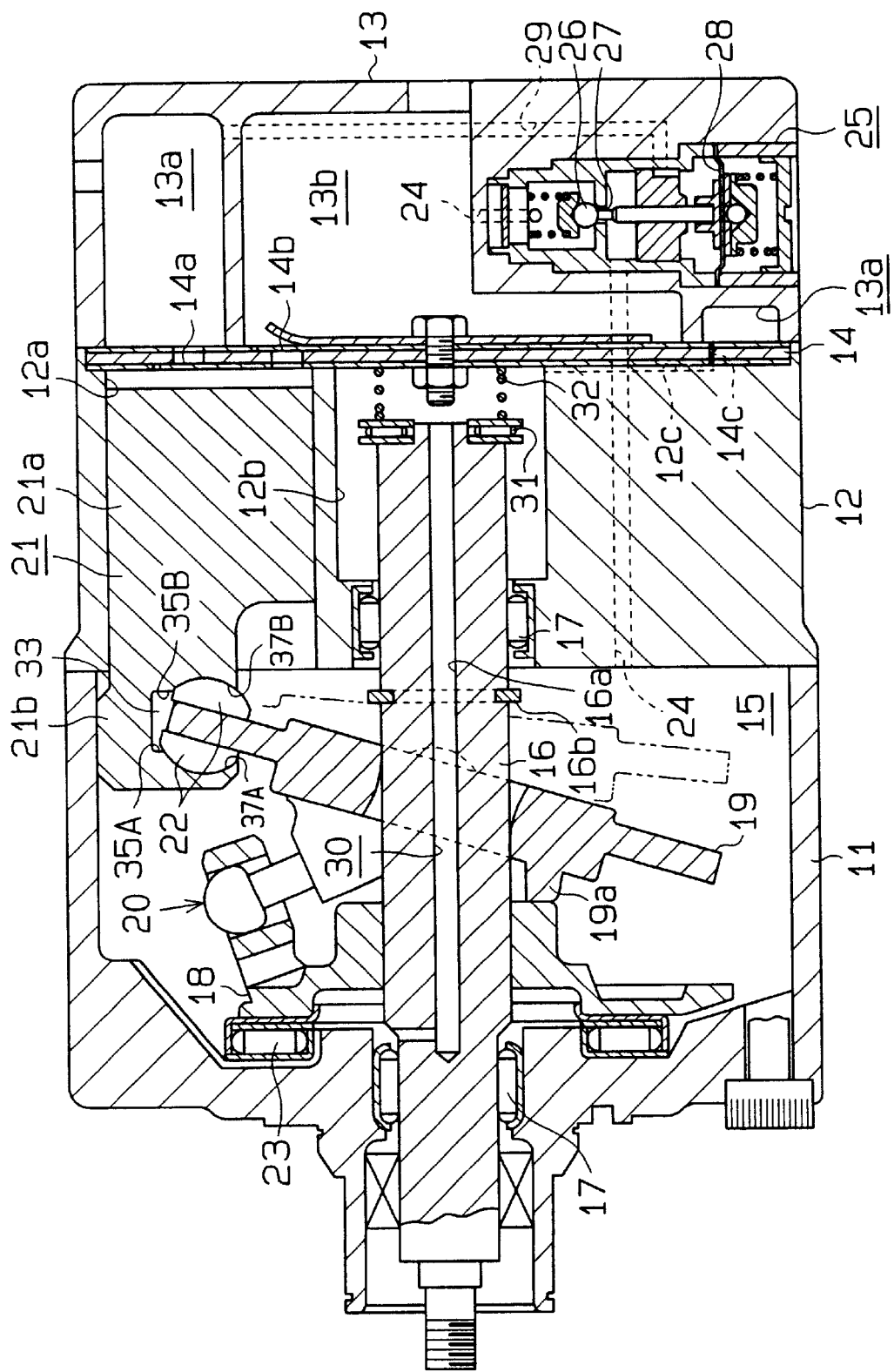
FIG. 3 is a cross-sectional view illustrating a variable displacement compressor.
Figure 4:
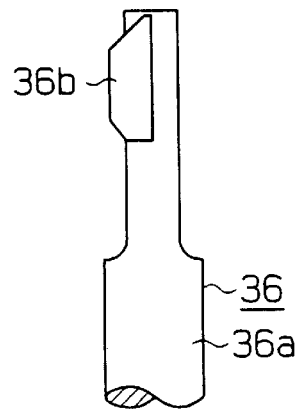
FIG. 4 is a front view illustrating a tool for machining pistons.
Figure 5:
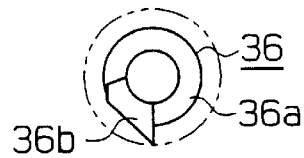
FIG. 5 is an end view illustrating the tool of FIG. 4 as seen from a plane indicated by line 5—5 of FIG. 4.
Figure 6:
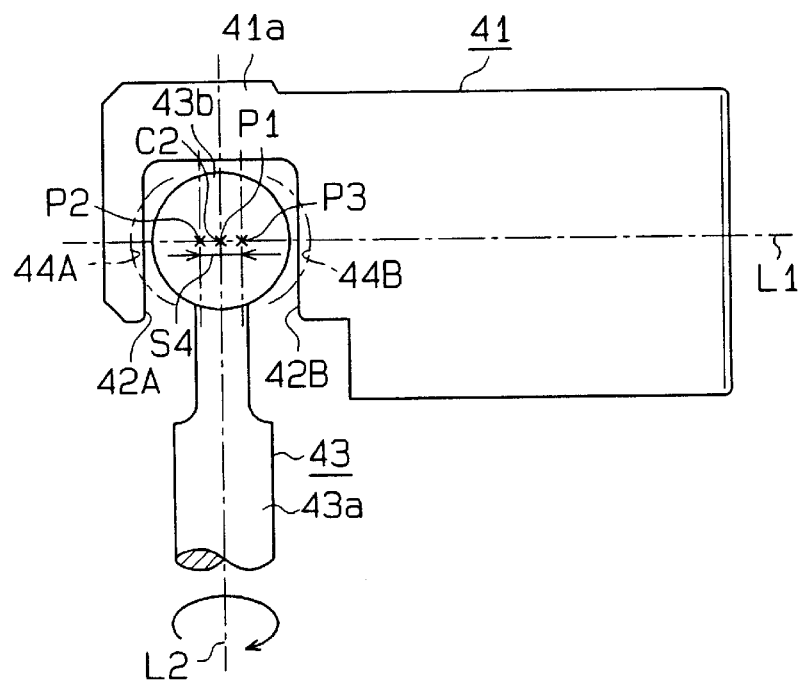
FIG. 6 is a front view illustrating a prior art piston machining method.

Firstly, the structure of a variable displacement compressor will be described. As shown in FIG. 3, a front housing 11 is coupled to the front end of a cylinder block 12. A rear housing 13 is coupled to the rear end of the cylinder block 12. The front housing 11, the cylinder block 12, and the rear housing 13 constitute a housing of the compressor.

The rear housing 13 includes a suction chamber 13a and a discharge chamber 13b. A valve plate 14 having suction flaps 14a and discharge flaps 14b is located between the rear housing 13 and the cylinder block 12. The front face of the cylinder block 12 and the front housing 11 define a crank chamber 15. The crank chamber 15 accommodates a drive shaft 16 that extends through the crank chamber 15 between the front housing 11 and the cylinder block 12. The drive shaft 16 is rotatably supported by a pair of bearings 17 located in the front housing 11 and in the cylinder block 12, respectively.

A rotor 18 is fixed to the drive shaft 16. A swash plate 19, which functions as a drive plate, is supported on the drive shaft 16 in the crank chamber 15. The swash plate 19 slides along the axis of and tilts with respect to the drive shaft 16. The swash plate 19 is coupled to the rotor 18 by a hinge mechanism 20. The hinge mechanism 20 guides the axial and tilting movements of the swash plate 19. The hinge mechanism 20 also causes the swash plate 19 to rotate integrally with the drive shaft 16.

The swash plate 19 has a stopper 19a protruding forward from the front surface. The abutment of the stopper 19a against the rotor 18 determines the maximum inclination position of the swash plate 19. The drive shaft 16 has a stopper ring 16b located between the swash plate 19 and the cylinder block 12. The abutment of the swash plate 19 against the stopper ring 16b restricts further inclination of the swash plate 19 and thus determines the minimum inclination position of the swash plate 19.

The cylinder block 12 includes cylinder bores 12a (only one is shown), the axes of which are located about the drive shaft 16. Each cylinder bore 12a houses a single-headed piston 21. The pistons 21 reciprocate in the cylinder bores 12a. Each piston 21 has a head 21a, which is retained in the cylinder bore 12a, and a skirt 21b, which projects from the head 21a toward the crank chamber 15. The skirt 21b has a slot 33 facing the swash plate 19. The slot 33 includes inner walls 35A, 35B, which face each other. Concave recesses 37A and 37B are formed in the walls 35A and 35B, respectively. Each recess 37A, 37B slidably receives the semispherical portion of a shoe 22.

The periphery of the swash plate 19 is fitted into the slot 33 of each piston 21 and is slidably held between the flat portions of the associated pair of shoes 22. The shoes 22 functions as a coupling member for coupling the pistons 21 with the swash plate 19. Rotation of the drive shaft 16 is converted to linear reciprocation of the piston 21 in the associated cylinder bore 12a by the swash plate 19 and the shoes 22.

A thrust bearing 23 is arranged between the rotor 18 and the front wall of the front housing 11. The front housing 11 receives the reaction force that acts on each piston 21 during compression of the gas by way of the shoes 22, the swash plate 19, the hinge mechanism 20, the rotor 18, and the thrust bearing 23.

The suction chamber 13 is connected with the crank chamber 15 by a supply passage 24 extending through the cylinder block 12, the valve plate 14, and the rear housing 13. The rear housing 13 accommodates a displacement control valve 25 that regulates the supply passage 24. The control valve 25 has a valve hole 27, a valve body 26 faced toward the valve hole 27, and a diaphragm 28 for adjusting the opened area of the valve hole 27. The diaphragm 28 is exposed to the pressure (suction pressure) in the suction chamber 13a by a pressure communicating passage 29, which displaces the diaphragm 28. Accordingly, the diaphragm 28 moves the valve body 26 and adjusts the opening between the valve hole 27 and the valve body 26.

The control valve 25 alters the amount of refrigerant gas flowing into the crank chamber 15 through the supply passage 24 from the discharge chamber 13b and adjusts the pressure of the crank chamber 15. Changes in the pressure of the crank chamber 15 alter the difference between the pressure of the crank chamber 15, which acts on the bottom surface of each piston 21 (the left surface as viewed in FIG. 3), and the pressure of the associated cylinder bore 12a, which acts on the head surface of the piston 21 (the right surface as viewed in FIG. 3). The inclination of the swash plate 19 is altered in accordance with changes in the pressure difference. This, in turn, alters the stroke of the piston 21 and varies the displacement of the compressor.

The crank chamber 15 is connected to the suction chamber 13a by a gas relieving passage 30. The relieving passage 30 includes an axial passage 16a extending through the center of the drive shaft 16, a retaining bore 12b defined in the center of the cylinder block 12, a groove 12c extending on the rear surface of the cylinder block 12, and a bore 14c formed in the valve plate 14. The inlet of the axial passage 16a opens to the crank chamber 15 at the vicinity of the front radial bearing 17. The relieving passage 30 constantly releases a certain amount of refrigerant gas from the crank chamber 15 to the suction chamber 13a.

The retaining bore 12b accommodates a thrust bearing 31 and a coil spring 32 between the rear end of the drive shaft 16 and the valve plate 14.

The operation of the above variable displacement compressor will now be described.

The drive shaft 16 is rotated by an external drive source such as a vehicle engine. The swash plate 19 is integrally rotated with the drive shaft 16 by the rotor 18 and the hinge mechanism 20. The rotation of the swash plate 19 is converted to linear reciprocation of each piston 21 in the associated cylinder bore 12a by the shoes 22. The reciprocation of the piston 21 draws the refrigerant gas in the suction chamber 13a into the cylinder bore 12a through the associated suction flap 14a. When the refrigerant gas in the cylinder bore 12a is compressed to a predetermined pressure, the gas is discharged into the discharge chamber 13b through the associated discharge flap 14b.

During operation of the compressor, if the cooling demand becomes great and the load applied to the compressor increases, high pressure in the suction chamber 13a acts on the diaphragm 28 of the control valve 25 causing the valve body 26 to close the valve hole 27. This closes the supply passage 26 and stops the flow of highly pressurized refrigerant gas from the discharge chamber 13b to the crank chamber 15. In this state, the refrigerant gas in the crank chamber 15 is released into the suction chamber 13a through the relieving passage 30. This decreases the pressure of the crank chamber 15. Thus, the difference between the pressure in the crank chamber 15 and the pressure in the cylinder bores 12a becomes small. As a result, the swash plate 19 is moved to the maximum inclination position, as shown by the solid lines in FIG. 3, and the stroke of the piston 21 becomes maximum. In this state the displacement of the compressor is maximum.

If the cooling demand decreases and the load applied to the compressor decreases, low pressure in the suction chamber 13a acts on the diaphragm 28 of the control valve 25 and causes the valve body 26 to open the valve hole 27. This communicates the high pressurized refrigerant gas in the discharge chamber 13b with the crank chamber 15 through the supply passage 24 and increases the pressure of the crank chamber 15. Thus, the difference between the pressure in the crank chamber 15 and the pressure in the cylinder bores 12a becomes large. As a result, the swash plate 19 moves toward the minimum inclination position and decreases the stroke of the piston 21. In this state the displacement of the compressor becomes small.

The diaphragm 28 adjusts the opening between the valve hole 27 and the valve body 26 in accordance with the suction pressure. The opening of the valve hole 27 alters the flow rate of the refrigerant gas supplied to the crank chamber 15 from the discharge chamber 13b and changes the pressure of the crank chamber 15. Changes in the crank chamber pressure alter the inclination of the swash plate 19. In this manner, the compressor displacement is optimally controlled by changing the suction pressure.

A method for machining the piston 21 will now be described.

Figure 1:
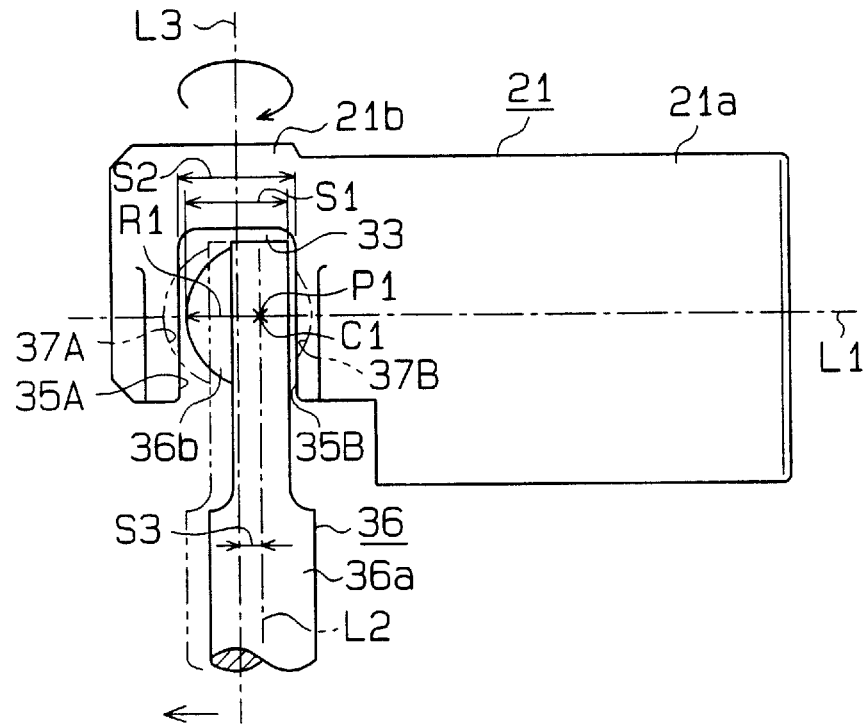
FIG. 1 is a front view illustrating a piston machining method according to one embodiment of the present invention.

First, as shown in FIG. 1, a tool 36 is inserted in the slot 33 formed in the skirt 21b of the piston 21. Specifically, the tool 36 is located between the walls 35A and 35B of the slot 33 such that the axis L2 of the tool 36 is perpendicular to the axis L1 of the piston 21. As illustrated in FIGS. 1, 2, 4 and 5, the tool 36 includes a shank 36a and a circular cutter 36b formed at the distal end of the shank 36a. The cutter 36b is arranged to face the wall 35A or the wall 35B. The cutter 36b is asymmetrical, and it generates a spherical pattern when rotated. The spherical pattern generated by the cutter 36b has a diameter that is greater than the width of the slot 33.

As shown in FIG. 1, the maximum width S1 of the cutter 36b is smaller than the distance S2 between the walls 35A, 35B. The radius R1 of the cutter 36b is equal to the radius R2 of the recesses 37A, 37B, which will be formed in the walls 35A, 35B. When the tool 36 is located at the position of FIG. 1 in relation to the piston 21, the center C1 of the cutter 36b matches an initial position P1, which is located on the axis L1 of the piston 21 and is displaced from the midpoint between the walls 35A and 35B by a distance S3.

Figure 2:
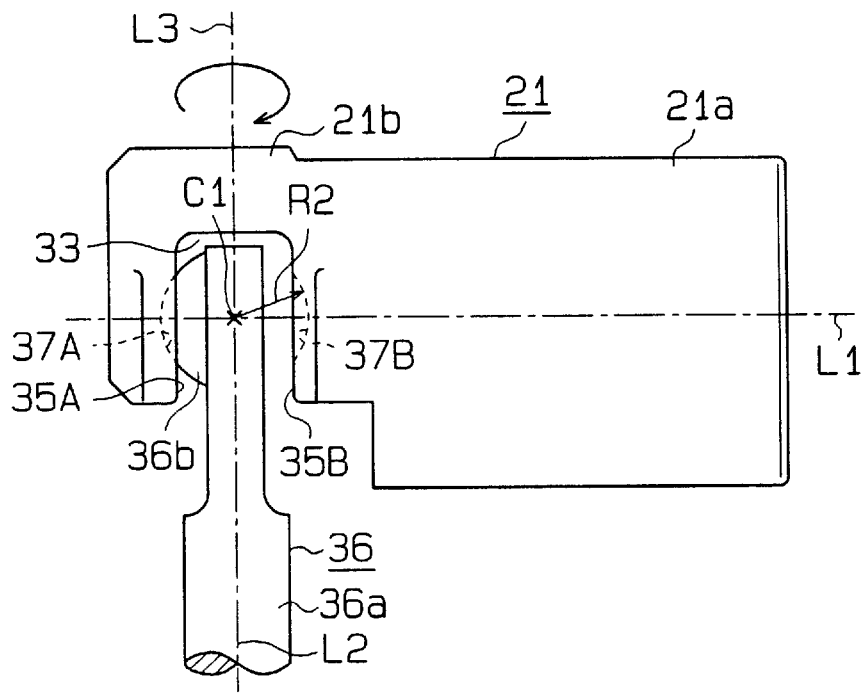
FIG. 2 is a front view illustrating a subsequent step of the method of FIG. 1.

In this state, the piston 21 is rotated about a rotation axis L3, which is perpendicular to the axis L1 of the piston 21 and which includes the midpoint of the walls 35A and 35B. At this time, the tool 36 does not contact the walls 35A and 35B. Then, as shown in FIGS. 1 and 2, the tool 36 is moved by the distance S3 so that the center C1 of the cutter 36b is moved from the initial position P1 to a position on the rotation axis L3 of the piston (specifically, a point of intersection of the axis L1 of the piston 21 and the rotation axis L3). This causes the cutter 36b to machine both recesses 37A, 37B at the same time.

In this manner, when machining the recesses 37A, 37B, the tool 36 is arranged such that the center C1 of the cutter 36b coincides with the point of intersection of the axis L1 of the piston 21 and the rotation axis L3. In this state, the piston 21 is rotated about the rotation axis L3. This forms the recesses 37A, 37B, which define a common sphere. The center of the sphere is the point of intersection of the axis L1 of the piston 21 and the rotation axis L3. The radius R2 of the sphere is equal to the radius R1 of the cutter 36b. In other words, the center of the sphere conforming to the recess 37A coincides with the center of the sphere conforming to the recess 37B.

If the pistons 21 machined in the above manner are employed in the compressor of FIG. 3, the recesses 37A, 37B allow the shoes 22 to slide on the recesses 37A, 37B in an ideal manner. Therefore, the shoes 22 smoothly convert rotation of the drive shaft 16 to linear reciprocation of the pistons 21.

In the variable displacement compressor of FIG. 3, the inclination of the swash plate 21 is determined by the difference between the pressure in the crank chamber 15 and the pressure in the cylinder bore 12a. Employing the pistons 21 in such a compressor allows the shoes 22 to smoothly slide in the recesses 37A, 37B regardless of the inclination of the swash plate 21. The swash plate 21 is therefore smoothly tilted.

In the machining method of FIGS. 1 and 2, the piston 21 is rotated with the tool 36 located between the walls 35A and 35B of the piston 21. Then, the tool 36 is moved such that the center C1 of the cutter 36b is displaced from the initial position P1 until it intersects the rotation axis L3 of the piston 21. The cutter 36b then simultaneously forms the recess 37A and the recess 37B, which conform to a common sphere, in the walls 35A, 35B, respectively. The method easily and accurately forms the recesses 37A, 37B and shortens the machining time.

The present invention is not limited to the steps described above. For example, the construction of the tool 36 may be altered. Also, the present invention may be alternatively embodied in the following forms:

When forming the recesses 37A, 37B, the center C1 of the cutter 36b need not be on the axis L1 of the piston 21 as long as the center C1 is on the rotation axis L3 of the piston 21.

In a further variation, the piston 21 may be moved by distance S3 rather than the tool 36.

In a further variation, the piston 21 may be rotated about an axis that extends perpendicular to the surface of the sheet of FIGS. 1 and 2. In this case, the tool 36 is re-oriented by 90° such that its axis L2 extends perpendicular to the sheet of FIGS. 1 and 2. This method also easily and accurately forms the recesses 37A and 37B so that they conform to a common sphere.

The method of the present invention may be employed for machining double-headed pistons and pistons in a fixed displacement compressor, in which the inclination of a swash plate is fixed.

Therefore, the present examples and embodiments are to be considered as illustrative and not restrictive and the invention is not to be limited to the details given herein, but may be modified within the scope and equivalence of the appended claims.

What is claimed is:

1. A method for machining a pair of opposed spherical recesses, which conform to a single imaginary sphere, in opposite surfaces of a slot of a compressor piston, wherein the slot is more narrow than the diameter of the imaginary sphere, the method comprising:

providing an asymmetrical cutter that is, at its widest point, narrower than the slot as measured in the direction of the longitudinal axis of the piston, wherein the cutter generates a sphere if rotated about a tool axis;

moving one of the cutter and the piston with respect to the other such that the cutter enters the slot without contacting either of the opposite surfaces, wherein the cutter has a center point that coincides with the center of the generated sphere, and wherein the generated sphere is the same size as the imaginary sphere;

rotating the piston about a machining axis to simultaneously machine the recesses, wherein the machining axis intersects the center point of the cutter; and moving one of the cutter and the piston with respect to the other to remove the cutter from the slot without contacting either of the opposite surfaces.

2. The method according to claim 1, wherein the method further comprises:

initially locating the center point of the cutter at a position within the slot that is displaced from the machining axis; and after the rotation about the machining axis is started, moving one of the cutter and the piston with respect to the other such that the center point of the cutter is moved from the initial position to a point on the machining axis for forming the recesses in the surfaces.

3. The method according to claim 2, further comprising:

moving the cutter with respect to the piston such that the center point of the cutter is moved from the initial position to a point of intersection of the machining axis and the longitudinal axis of the piston.

4. The method according to claim 1, wherein the rotation about the machining axis is accomplished by rotating the piston while holding the cutter stationary.

5. A method for machining spherical recesses in a compressor piston, wherein the piston has a slot for receiving a drive plate and a pair of semi-spherical shoes for converting rotation of the drive plate to reciprocation of the piston, and wherein the slot has a pair of opposed walls that are separated by a fixed distance, the method comprising:

placing a tool having an asymmetrical hemispherical cutter within the slot, wherein the cutter, if rotated, generates a sphere that has a diameter greater than the fixed distance, and wherein the cutter has a center point corresponding to the center of the generated sphere;

rotating the piston with respect to the tool about a machining axis that is transverse to the longitudinal axis of the piston, wherein the machining axis intersects a sphere location point, which is located within the slot;

moving one of the tool and the piston with respect to the other such that the cutter contacts the walls during the rotation about the machining axis for forming the recesses in the walls, wherein one of the tool and the piston is moved to align the center point with the machining axis such that the resulting recesses conform to a single spherical shape, which corresponds to the generated sphere.

6. The method according to claim 5, wherein the machining axis is perpendicular to the longitudinal axis of the piston, and the machining axis intersects a point that is midway between the walls, the method further comprising:

initially locating the center point of the cutter in a position within the slot that is displaced from the machining axis; and after the rotation of the piston with respect to the tool is started, moving one of the tool and the piston with respect to the other such that the center point of the cutter is moved from the initial position to a point on the machining axis for forming the recesses.

7. The method according to claim 6, further comprising moving the tool such that the center point of the cutter is moved from the initial position to a point of intersection of the machining axis and the longitudinal axis of the piston.

8. The method according to claim 5, including the step of providing the cutter such that the maximum width of the cutter, as measured in the direction of the longitudinal axis of the piston, is less than the distance between the walls.

9. A method for machining a piston for a variable displacement compressor that includes a cylinder bore for housing a piston and a drive plate that is tiltably supported on a drive shaft in a crank chamber, wherein the drive plate is operably coupled to the piston by a pair of semi-spherical shoes for converting rotation of the drive shaft into reciprocation of the piston, wherein the inclination of the drive plate varies according to the difference between the pressure in the crank chamber and the pressure in the cylinder bore such that the piston is moved by a stroke based on the inclination of the drive plate and such that the displacement of the compressor is controlled by varying the stroke of the piston, wherein the piston includes a slot for receiving the drive plate, the slot includes a pair of opposed walls, and wherein each wall has a spherical concave recess for slidably supporting one of the shoes, the method comprising:

placing a tool having a cutter between the walls of the slot;

rotating the piston about a machining axis that is perpendicular to the longitudinal axis of the piston, wherein the machining axis intersects a predetermined sphere location point between the walls, wherein the sphere location point is located on the longitudinal axis of the piston;

moving the tool with respect to the piston such that the cutter contacts the walls during the rotation of the piston for forming the recesses in the walls, wherein the formed recesses conform to a sphere, the center of which is the sphere location point.

10. The method according to claim 9, wherein the machining axis is perpendicular to the axis of the piston and is located midway between the walls, the method further comprising:

placing the cutter between the walls of the piston such that an axis of the tool is perpendicular to the axis of the piston, wherein the cutter has a radius that corresponds to the radius of the recesses to be formed;

initially locating the radial center of the cutter at a position that is displaced from the machining axis; and moving the tool such that the radial center of the cutter is moved from the initial position to a point on the machining axis during the rotation of the piston for forming the recesses.

11. The method according to claim 10, further comprising moving the tool such that the radial center of the cutter is moved from the initial position to a point of intersection of the machining axis and the axis of the piston.

12. The method according to claim 9, including the step of providing the cutter such that the maximum width of the cutter, as measured in the direction of the longitudinal axis of the piston, is less than the distance between the walls.

* * * * *